United States Patent [19]

Compton

[11] Patent Number: 4,932,195
[45] Date of Patent: * Jun. 12, 1990

[54] METHOD AND APPARATUS FOR COOLING THE SHAKER HEADS OF A TREE SHAKING HARVESTER MACHINE

[75] Inventor: Ira Compton, 2434 Dayton Rd., Chico, Calif. 95928

[73] Assignee: Ira Compton, Chico, Calif.

[ * ] Notice: The portion of the term of this patent subsequent to Jul. 19, 2005 has been disclaimed.

[21] Appl. No.: 350,755

[22] Filed: May 11, 1989

[51] Int. Cl.⁵ ............................................. A01D 46/26
[52] U.S. Cl. .................................. 56/340.1; 56/328.1; 56/DIG. 2; 165/84
[58] Field of Search ............. 56/340.1, 328.1, DIG. 2; 165/84; 62/259.1

[56] References Cited

U.S. PATENT DOCUMENTS

| | | | |
|---|---|---|---|
| 2,354,188 | 7/1944 | Aschenbrenner | 165/84 X |
| 3,630,003 | 12/1971 | Ashton et al. | 56/12.8 X |
| 4,537,244 | 8/1985 | Holden | 51/324 X |
| 4,657,068 | 4/1987 | Peltz | 51/235 X |

Primary Examiner—Jerome W. Massie, IV
Assistant Examiner—Matthew Smith

[57] ABSTRACT

A generally closed circulatory system of tubing between a first heat exchanger built into the shaker head, and a second heat exchanger positioned remote of the first heat exchanger. The closed circulatory system contains a coolant which is coursed through the first heat exchanger whereat heat is pulled from the shaker head into the coolant. The heated coolant is then coursed through the second heat exchanger where the increased heat of the coolant is expelled. The coursing of the coolant through the two heat exchangers is a generally continuous cycle.

17 Claims, 6 Drawing Sheets

METHOD AND APPARATUS FOR COOLING THE SHAKER HEADS OF A TREE SHAKING HARVESTER MACHINE

BACKGROUND OF THE INVENTION

1. Field of the Invention:

This invention relates to agricultural harvesting equipment in general, and more precisely to cooling the shaker heads on the mechanical shaker arms of nut and fruit tree shaker type harvesting equipment.

2. Description of the Prior Art:

Over the years the agricultural industry has developed equipment which quickly harvests the fruit of entire trees in a matter of seconds. One type of fruit and nut tree harvester now widely used has two extending mechanical shaker arms which project outward from the side or front of the harvester. The shaker arms are designed to temporarily clamp against the base of the tree. The shaker arms are then mechanically vibrated to shake the fruit or nuts out of the tree. This disclosure is directed at this type of harvesting equipment.

To protect the tree from damage, pliable synthetic rubber padding is attached to the distal ends of the shaker arms. The shaker heads, as they commonly referred to in the industry, each include the distal end of each metal shaker arm and all the pliable padding attached thereon. The padding of a shaker head normally includes a main shaker pad, a sling, and a slip pad. The shaker pad itself is a large cylindrical structure supported on the distal end of the shaker arm by the rectangular, somewhat thin flexible pad referred to as the sling. A second rectangular flexible pad, commonly known as the slip pad, is attached to the upper surface of the shaker arm and draped downward over the exterior of the sling. The lower or bottom side of the slip pad is releasably attached to the bottom surface of the shaker arm by elastic cords and hooks. The elastic cord attachment method of the slip pad allows the bottom of the pad to be unhooked and flipped upward onto the top of the shaker arm to expose the outer surface of the sling. Exposing the sling allows a heat resistant grease to be applied between the sling and the slip pad to decrease the friction between the two pads during shaking. The grease allows the slip pad to remain substantially stable against the tree while the majority of the friction created by the vibration of the shaker head is between the sling and the slip pad and not the bark of the tree. Unfortunately even with the grease, friction is still present between the layers of padding and consequently heat is developed in the pads. Due to the high temperatures developed by the rapid movement of the sling against the slip pad, the normally thick grease becomes thin, and is forced out from between the padding dropping to the ground. The grease must be reapplied periodically, usually every thirty to sixty minutes of continuous tree shaking. If the grease is not applied often enough, the heat in the shaker head will continue to rise. This concentrated heat causes the materials of the padding to deteriorate rapidly, shortening the life of the expensive pads.

When the harvest of an orchard has been contracted by the tree, or under adverse weather conditions, time is of the essence in harvesting. Applying grease will usually take one man five to ten minutes. The time required to periodically apply grease reduces overall profits since time is money. The tendency to stretch the time between greasing will and does occur to the detriment of the padding of the shaker head.

SUMMARY OF THE INVENTION

In practicing the immediate invention, I have devised a method and an apparatus for effectively cooling the shaker heads of shaker type nut and fruit tree harvesting equipment. By using a generally closed coolant containing circulatory system of tubing between a first heat exchanger built into the shaker head and a second heat exchanger positioned remote of the first heat exchanger, heat is pulled from the shaker head into the coolant. The heated coolant is then coursed through the system to the second heat exchanger where the increased heat of the coolant is expelled. The coursing of the coolant through the circulatory system is generally continuous during operation. By maintaining a cooled shaker head the expected functional life of the pliable synthetic rubber of the shaker head pads is increased, and time normally spent lubricating between the padding of the shaker is reduced.

Therefore, it is a primary object of my invention to provide a method and apparatus for cooling the shaker heads of shaker type nut and fruit harvesting equipment.

A further object of the invention is to provide a method and apparatus for keeping the shaker heads cooled during harvesting of fruit and nut trees to reduce the expense and time required to grease between pad layers.

A still further object of the invention is to maintain a cool shaker head to increase the expected functional life of the pliable synthetic rubber of the shaker head pads.

Other objects will become clear from reading descriptions of numbered parts in the remaining specification and comparing them with similarly numbered parts shown in the appended drawings.

DESCRIPTION OF THE PREFERRED EMBODIMENTS

Figure 1:
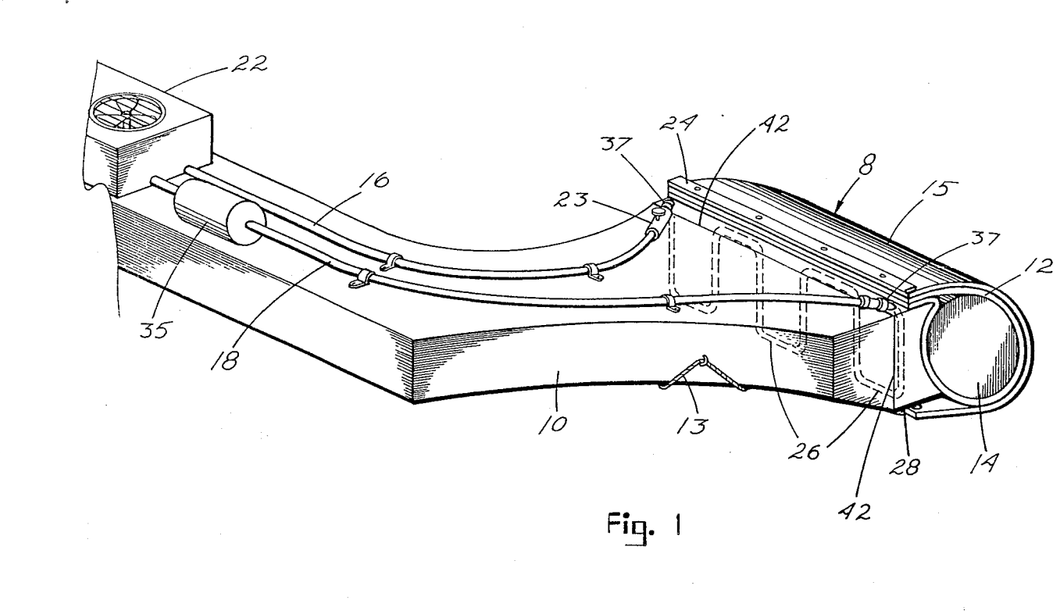
FIG. 1 shows a perspective view of the distal end of one shaker arm illustrating a first heat exchanger in the curved metal pad support adjacent the padding layers. A second heat exchanger is shown on top of the shaker arm connected to the first heat exchanger by tubing.
Figure 7:
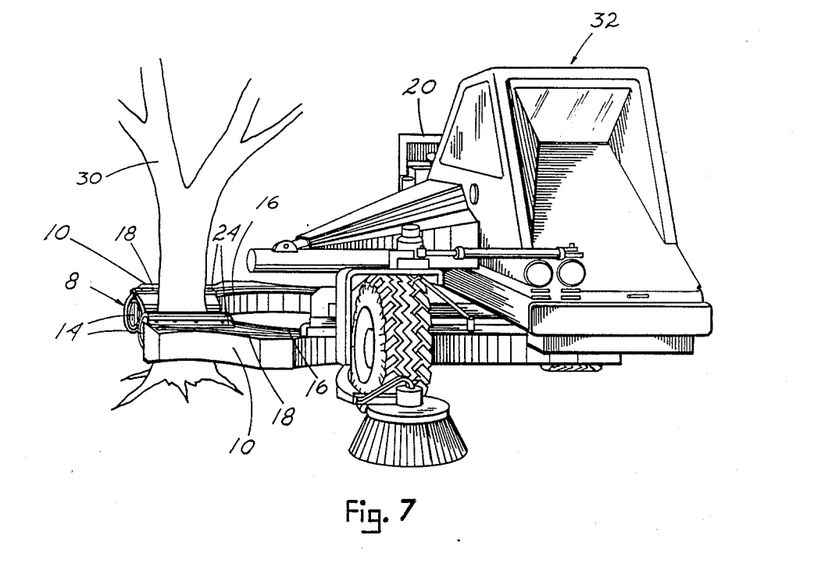
FIG. 7 shows a typical nut and fruit tree shaker machine in operation using coolant cooled shaker heads. Both shaker arms of the machine are shown clamped around the base of a tree.
Figure 8:
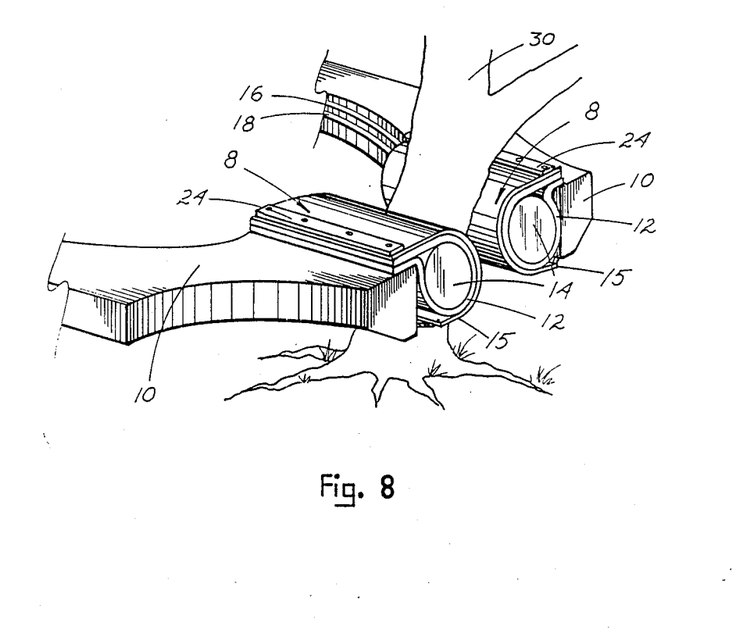
FIG. 8 shows an enlargement of the distal ends of the shaker arms with shaker heads clamped around the base of a tree for the shaking process.

Referring now to the drawings in general, and to Fig. 1 in particular where one shaker arm 10 is illustrated supporting a shaker head 8. Two shaker arms 10 are normally required on a tree shaking machine 32 designed to grasp the tree 30 at the base for the shaking process. FIG. 7 shows both shaker arms 10 attached to a shaker type nut and fruit tree harvester machine 32. Each shaker arm 10 has a shaker head 8 at the distal end of the arm 10. For the purpose of this disclosure the shaker head consists of curved metal pad support 28 or the metal distal end plate of the shaker arm 10, the main shaker pad 14, the sling 12, and slip pad 15. If more or fewer layers of pliable padding are used on the distal ends of shaker arms 10, the invention disclosed herein is still applicable.

In FIG. 1 the shaker head is coolant cooled with heat exchanging tubing 26 within curved metal pad support 28. The second shaker arm 10 not shown in this view would be structured similarly. In this example of the invention a refrigeration condenser 22 and refrigeration pump 35 are shown positioned on top of the shaker arm 10 remote of shaker head 8. Refrigeration condenser 22 and pump 35 are illustrated connected by a input coolant tubing 16 and a output coolant tubing 18 to heat exchanging tubing 26 in curved metal pad support 28 at the metal distal end of shaker arm 10. Curved metal pad support 28 as shown in FIG. 1 is a cast steel structure attached to the terminal or distal end of shaker arm 10 by weld seam 42. Curved metal pad support 28 on the curved pad support side opposite weld seam 42 is curved to match the curve of main shaker pad 14 shown in FIG. 1. The curved metal pad support 28 is common to many shaker machines 32 on the market today where it is used to help maintain the curved shape of main shaker pad 14 during clamping. Curved metal pad support 28 is manufactured of cast steel and shaped as shown without tubing 26 for both economical manufacturing cost and structural strength. Part of the structuring shown in FIG. 1 which is unique to the industry is the addition of heat exchanging tubing 26 attached interiorly of shaker arm 10 to the backside of curved metal pad support 28. The heat exchanging tubing 26 used must have good thermal conductivity. Steel or copper tubing has been found to function well. Heat exchanging tubing 26 as shown is a single piece of tubing bent in a number of U-shaped bends in order to provide greater surface area contact between the tubing 26 and curved metal pad support 28. Good surface area contact is provided between curved metal pad support 28 and the attached synthetic rubber padding of sling 12 and main pad 14 by the curved side of the metal pad support 28. Good surface area contact is necessary for adequate heat transference.

In FIG. 1, each of the ends of heat exchanging tubing 26 are shown brought out from the interior of curved metal pad support 28. Input coolant tubing 16 is shown attached to one end of heat exchanging tubing 26 by a releasable tubing connector 37. The opposite end of heat exchanging tubing 26 is shown attached to output coolant tubing 18 by a second releasable tubing connector 37. Releasable tubing connectors 37 are used for ease of installation and servicing. A complete coolant circulatory system is formed through the attachment of the first heat exchanger formed by heat exchanging tubing 26 in the shaker head 8 and the attachment of input tubing 16 and output tubing 18 to refrigeration condenser 22 and pump 35. Shown attached in-line to input tubing 16 adjacent curved metal pad support 28 is a refrigerant metering valve 23, a usually necessary component of any refrigeration system. The refrigeration system shown in FIG. 1 contains a refrigerant such as Freon or other suitable substance useful as a refrigerant.

The operational principles of the system for cooling the shaker head 8 shown in FIG. 1 utilizes the basic principles of refrigeration. Refrigeration pump 35 compresses a fluorocarbon gas such as Freon into condenser 22 where the refrigerant is compressed into a liquid. During the changing process of the refrigerant gas to a liquid, the energy level of the refrigerant is reduced and the energy released from the gas is expelled as heat from the condenser 22. The liquid refrigerant within condenser 22 is also within the attached input coolant tubing 16. The liquid refrigerant is metered through refrigerant metering valve 23 which is either an expansion valve or other metering device. The refrigerant is sprayed from the metering valve 23 into the low pressure side of the refrigeration system. Heat exchanging tubing 26 in shaker head 8 is located in the low pressure side of the refrigeration system adjacent refrigerant metering valve 23. When the liquid refrigerant is sprayed into the low pressure heat exchanging tubing 26, the liquid begins changing back into a gas, extracting heat or energy from tubing 26 and surfaces contacting the tubing 26. The temperature of the heat exchanging tubing 26 and curved metal pad support 28 are reduced. The main shaker pad 14, the sling 12 and the slip pad 15 shown attached to the curved metal pad support 28 are also cooled. The refrigerant gas is pulled from heat exchanging tubing 26 through the output coolant tubing 18 by refrigeration pump 35 and is pressured back into the refrigeration condenser 22 where the heat or energy extracted from shaker head 8 is expelled. The refrigerant is continuously cycled through the system extracting heat from the shaker head 8 and expelling the extracted heat at the remotely positioned condenser 22. The heat exchanging tubing 26 serves as the refrigerant evaporator in this example. Those skilled in the art will recognize this is a completely closed circulatory system using well known refrigeration principles and components. In the above description, the heat exchanging tubing 26 built into the shaker head 8 is considered the first heat exchanger, and the refrigeration condenser 22 is considered the second heat exchanger. Although only one of the two shaker arms 10 is shown in FIG. 1, the un-shown shaker arm 10 would be structured similarly to that shown, using either a separate refrigeration system mounted on that shaker arm 10 or using the refrigeration condenser 22 and pump 35 shown in FIG. 1. This will be understood by those skilled in the art since it is common to use one refrigeration condenser and pump with more than one evaporator. Also, it is anticipated that the tree shaker machine 32 will often have a refrigerated air conditioning system for the operator in the cab, and that refrigeration system could be tapped into with tubing to operate the first heat exchangers in the shaker heads 8.

Figure 2:
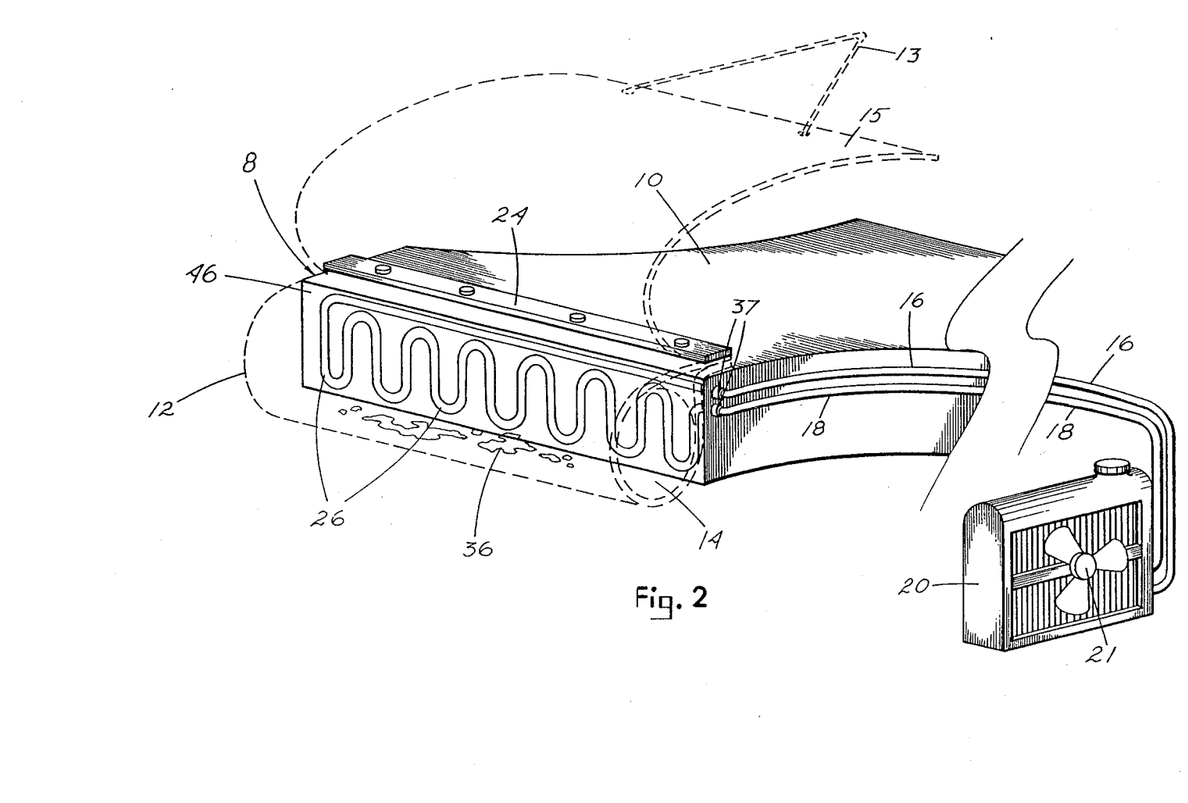
FIG. 2 is a perspective view of the distal end of one shaker arm illustrating a first heat exchanger in the inside of the end of the shaker arm adjacent the padding layers. A second heat exchanger is shown connected to the first heat exchanger by tubing.
Figure 3:
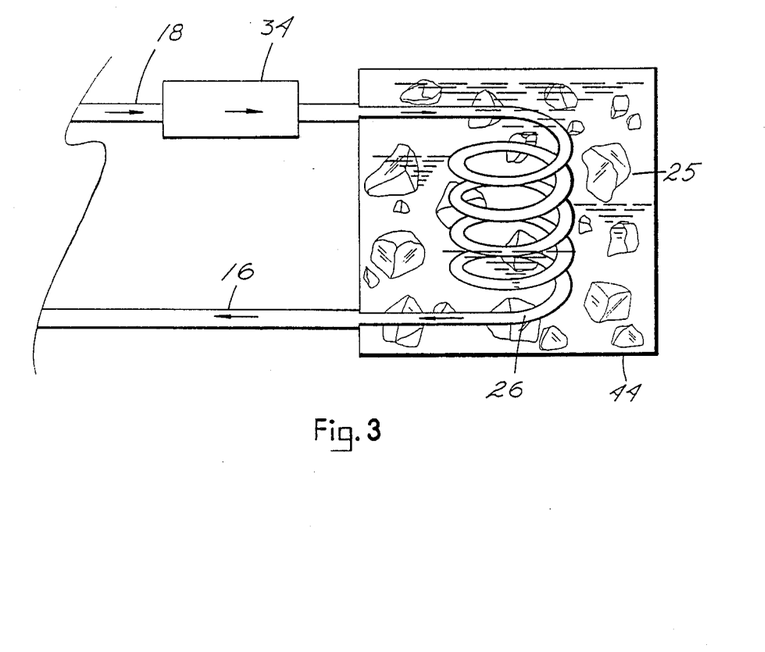
FIG. 3 is an ice bath heat exchanger connected to tubing and a circulation pump. The ice bath is used as a second heat exchanger useful for cooling a liquid coolant.

Referring now to FIG. 2 where the distal end of one shaker arm 10 is illustrated. In this example of the invention, curved metal pad support 28 is not shown attached to the distal end or shaker arm 10. The padding of the shaker head 8 is retained directly against the closed distal end of the hollow metal shaker arm 10. Inside, attached against the end plate 46 of the shaker arm 10 is heat exchanging tubing 26 or the first heat exchanger in this example. Again, heat exchanging tubing 26 is attached to coolant input tubing 16 and coolant output tubing 18 which is attached to a second heat exchanger. The second heat exchanger in this example is a radiator 20. Radiator 20 in this example is cooled with assistance from an electric radiator air moving fan 21 powered by the generator or alternator of shaker harvester 32. The coolant used in this example would be liquid such as water, anti-freeze or other suitable liquid coolant. Radiator 20 as shown in FIG. 2 and FIG. 7 would normally be mounted somewhere on shaker harvest machine 32 remote of shaker arms 10. In certain conditions the radiator for the harvester engine could also serve as the second heat exchanger shown in FIG. 2. In FIG. 2 no coolant circulation pump is shown. Heat convection flow is used when the radiator 20 can be positioned upward of the first heat exchanger. However, as shown in FIG. 3 an electrically powered mechanical circulation pump 34 can be attached into either input tubing 16 or output tubing 18 as needed for circulating the coolant. In this example of the invention, low temperature liquid coolant is coursed from radiator 20 through input tubing 16 into heat exchanging tubing 26 where heat is extracted from the shaker head 8 by the cold coolant. The heated coolant is then coursed through output tubing 18 back into radiator 20 where the heat is extracted from the coolant prior to the coolant being returned to the heat exchanging tubing 26 in the shaker head 8. The method and equipment in this example is very similar to that used in most automobile cooling systems today. Also shown in FIG. 2 is the slip pad 15 with attached elastic cord 13 in the raised position to allow the application of grease 36 between sling 12 and slip pad 15.

Shown in FIG. 3 is a container 44 having an ice bath 25 inside. Ice bath 25 is illustrated having a coil of heat exchanging tubing 26 inside the mixture of water and ice. The coil of tubing 26 must be made of a material having good thermal conductivity. The coil of heat exchanging tubing 26 is shown attached at one end of output tubing 18 and at the opposite end to input tubing 16. A circulation pump 34 is shown attach in-line to output tubing 18. Ice bath 25 illustrates a second heat exchanger useful for extracting heat from heated liquid coolant prior to the coolant being returned to the first heat exchanger located in a heat concentrating area of the shaker head 8.

Figure 4:
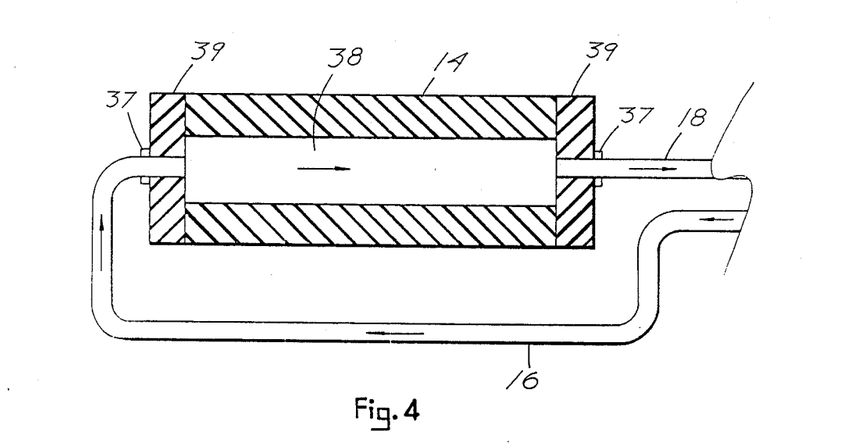
FIG. 4 is a sectional view of a main shaker pad adapted to function as a first heat exchanger for cooling the shaker head.

FIG. 4 shows a sectional view of a main shaker pad 14 structured in a manner for the pad to serve as first heat exchanger of the shaker head 8. Input tubing 16 is illustrated connected with a releasable tubing connector 37 to end cap 39 of main pad 14. Output tubing 18 is shown connected with a second releasable tubing connector 37 to the opposite end cap 39 of main pad 14. Main pad 14 is shown as a hollow structure having an open chamber 38 in the center. Coolant is coursed through the open chamber 38 whereat the low temperature coolant absorbs heat from the surrounding structures. The main pad 14 structure shown in FIG. 4 can be used in combination with a variety of second heat exchangers such as one of those shown in FIG. 1, 2 and 3. A refrigerant metering valve 23 of some type would be needed when using pressured refrigeration as the coolant in main shaker pad 14.

Figure 5:
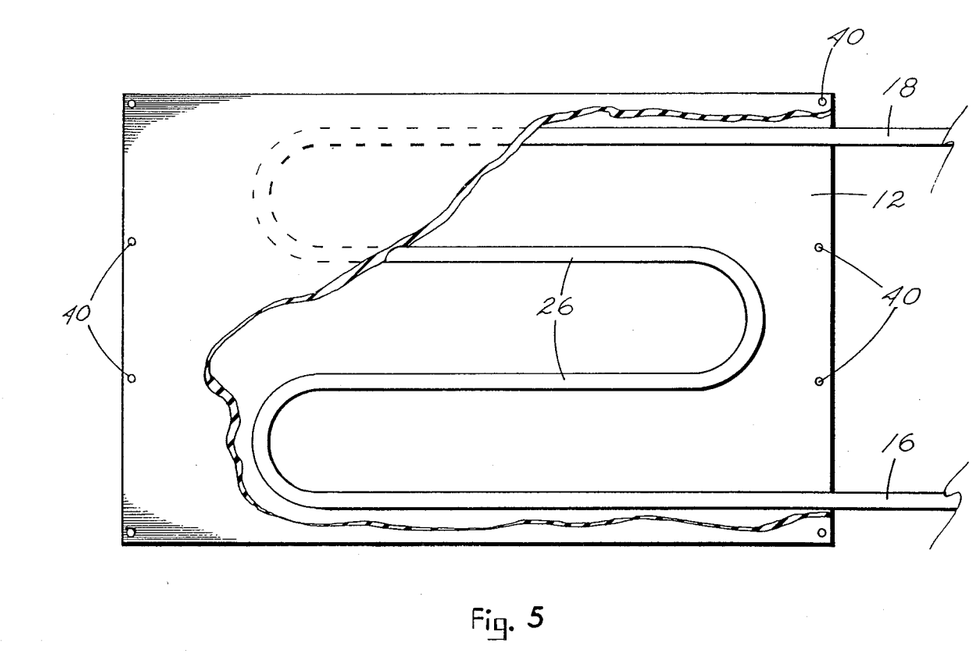
FIG. 5 is a partial cutaway of a sling adapted to function as a first heat exchanger for cooling the shaker head.

FIG. 5 illustrates a sectional view a sling 12 structured to function as a first heat exchanger for the shaker head 8. Heat exchanging tubing 26 is shown positioned inside the synthetic rubber of the sling 12 and attached to input and output tubing 16 and 18. Attachment bolt apertures 40 are illustrated at each end of the sling 12 to allow bolting of each end of the sling 12 to the top of shaker arm 10 using bolts and a sling attachment bar 24 as shown in both FIG. 1 and 2. The sling 12 structure shown in FIG. 5 can be used in combination with a variety of second heat exchangers such as one of those shown in FIG. 1, 2 and 3. A refrigerant metering valve 23 of some type would be needed when using pressured refrigeration as a coolant in sling 12.

Figure 6:
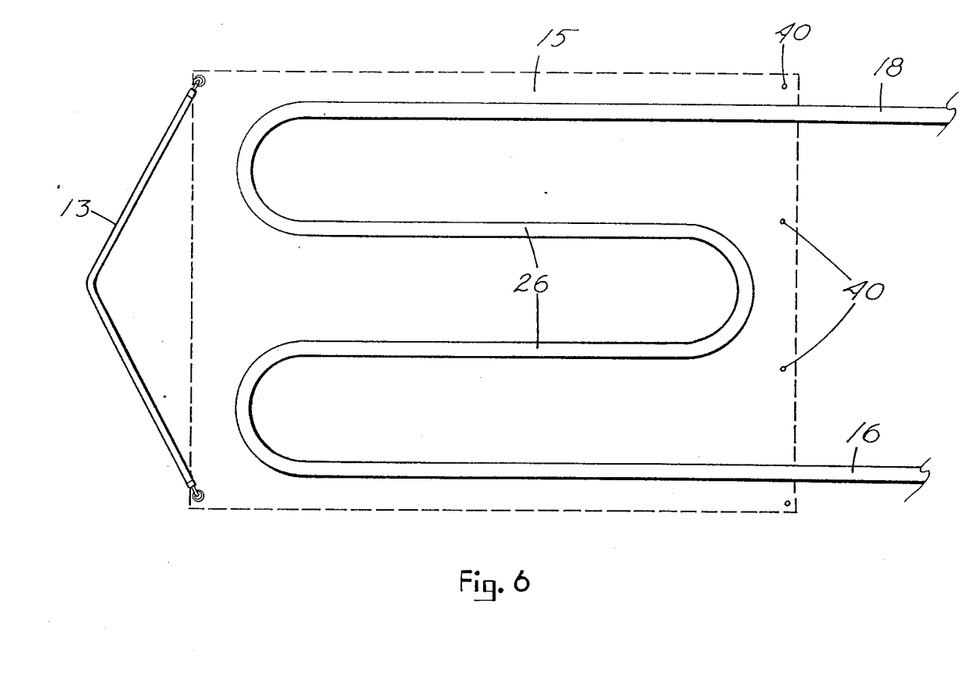
FIG. 6 illustrates a slip pad adapted to function as a first heat exchanger for cooling the shaker head.

FIG. 6 illustrates a slip pad 15 with attached elastic cord 13. The slip pad 15 is structured to serve as a first heat exchanger of the shaker head 8.

The operational principles of the main shaker pad 14, sling 12 and slip pad 15 when structured as first heat exchangers for cooling the shaker head 8 are the same as those described above for first heat exchanger shown in FIG. 1 and 2.

Although one first heat exchanger located in the shaker head 8 of each shaker arm 10 can function adequately for cooling the shaker head 8, under certain circumstances, two or more first heat exchangers such as one in the main pad 14 and one in the slip pad 15 will be used in conjunction for increased cooling capacity.

FIG. 7 illustrates a shaker type nut and fruit tree harvester machine 32 having coolant cooled shaker heads 8. Both shaker arms 10 are shown clamped around the base of the tree 30 in preparation for shaking the tree 30.

Thus having described and shown my invention by example in the drawings and in the specification, it is obvious that modifications in my invention by others skilled in the art after reading this disclosure could be accomplished, therefore, I will consider any changes made which fall within the intended scope and spirit of the appended claims as my invention.

What I claim as my invention is:

1. A method of cooling a shaker head retained on a distal end of a shaker arm of a tree shaking harvester machine, comprising the steps of;
    (a) coursing a coolant in a generally closed circulatory system through a first heat exchanger built into said shaker head whereat said coolant absorbs heat from said shaker head;
    (b) coursing said heated coolant from said first heat exchanger through a second heat exchanger positioned generally remote of said first heat exchanger whereat said absorbed heat is expelled from said coolant;
    (c) coursing said coolant from said second heat exchanger through said first heat exchanger and back through said second heat exchanger in a generally continuous cycle.

2. The method according to claim 1 wherein said coolant is used in a liquid form.

3. The method according to claim 1 wherein said coolant is used in a refrigerant gas form.

4. The method according to claim 1 wherein said coolant is used in a combination of refrigerant liquid and gas form.

5. The method according to claim 1 wherein said first heat exchanger is located in a main pad of said shaker head.

6. The method according to claim 1 wherein said first heat exchanger is located in a main pad retaining sling of said shaker head.

7. The method according to claim 1 wherein said first heat exchanger is located in a slip pad of said shaker head.

8. The method according to claim 1 wherein said first heat exchanger is located in said distal end of said shaker arm.

9. The method according to claim 1 wherein said coursing of said coolant is caused by heat convention flow.

10. The method according to claim 1 wherein said coursing of said coolant is caused by mechanical pumping of said coolant.

11. The method according to claim 1 wherein said second heat exchanger is mounted on said shaker arm adjacent said shaker head.

12. The method according to claim 1 wherein said second heat exchanger is mounted on said tree shaking harvester machine remote of said shaker arm.

13. The method according to claim 1 wherein said absorbed heat in said coolant is expelled away from said coolant and said shaker head.

14. The method according to claim 1 wherein said generally closed circulatory system includes the use of tubing between said first heat exchanger and said second heat exchanger.

15. The method according to claim 1 wherein said expelling of said heat at said second heat exchanger includes moving air through said second heat exchanger with a motorized air moving fan.

16. The method according to claim 1 wherein said expelling of heat at said second heat exchanger includes use of an ice bath.

17. A coolant cooled shaker head on a tree shaking harvester machine, comprising:
 a first means of heat exchanging;
 a second means of heat exchanging;
 tubing connecting said first and said second means of heat exchanging adapted to form a circulatory system;
 said circulatory system containing said coolant;
 said circulatory system adapted to circulate said coolant through said first means of heat exchanging and return said coolant back to said second heat exchanging means in a generally continuous cycle;
 said first means of heat exchanging being an integrated part of said shaker head;
 said first means of heat exchanging being positioned in a heat concentrating area of said shaker head;
 said first means of heat exchanging adapted to extract heat from said heat concentrating area of said shaker head depositing said extracted heat into said coolant;
 said second means of heat exchanging adapted to extract at least a portion of said deposited heat from said coolant prior to said coolant being returned to said first means of heat exchanging.

* * * * *